(12) United States Patent
Cho et al.

(10) Patent No.: US 7,296,281 B2
(45) Date of Patent: Nov. 13, 2007

(54) EDDY ATTENUATING APPARATUS FOR AN OPTICAL PICKUP ASSEMBLY AND DISC DRIVE ADOPTING THE SAME

(75) Inventors: Won-ik Cho, Seoul (KR); Myung-ryul Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 393 days.

(21) Appl. No.: 10/937,256

(22) Filed: Sep. 10, 2004

(65) Prior Publication Data

US 2005/0144631 A1    Jun. 30, 2005

(30) Foreign Application Priority Data

Dec. 30, 2003    (KR) ............... 10-2003-0100425

(51) Int. Cl.
   *G11B 7/08*    (2006.01)
   *G11B 33/08*   (2006.01)
(52) U.S. Cl. .................................... 720/688
(58) Field of Classification Search ........... 720/681, 720/648, 651, 671, 688, 658, 659
   See application file for complete search history.

(56) References Cited

U.S. PATENT DOCUMENTS 5,200,945 A * 4/1993 Engler et al. ............... 369/99
5,790,511 A * 8/1998 Juso et al. .................. 720/671

FOREIGN PATENT DOCUMENTS

JP    63-026843    2/1988
KR    91-7820     5/1991

OTHER PUBLICATIONS

Korean Office Action for Application No. 10-2003-0100425 dated Jun. 28, 2005.

* cited by examiner

*Primary Examiner*—Julie Anne Watko
(74) *Attorney, Agent, or Firm*—Staas & Halsey LLP

(57) ABSTRACT

An optical pickup assembly having: a pickup base; an actuator installed in the pickup base, and having a blade, on which an objective lens to radiate light onto a disc is mounted; a cover, installed to surround the actuator, and regulating a range of movement of the blade; and an attenuator protruding from an inside of the cover, splitting an eddy current occurring during rotation of the disc into a plurality of small eddy currents, and attenuating a disturbance acting on the blade.

34 Claims, 8 Drawing Sheets

EDDY ATTENUATING APPARATUS FOR AN OPTICAL PICKUP ASSEMBLY AND DISC DRIVE ADOPTING THE SAME

CROSS-REFERENCE TO RELATED APPLICATIONS

This application claims the priority of Korean Patent Application No. 2003-100425, filed on Dec. 30, 2003, in the Korean Intellectual Property Office, the disclosure of which is incorporated herein by reference.

BACKGROUND OF THE INVENTION

1. Field of the Invention

The present invention relates to an optical pickup assembly, and more particularly, to an optical pickup assembly having an actuator to reduce an eddy current caused by air flow occurring during rotation of a disc.

2. Description of the Related Art

In general, an optical pickup assembly is a device that records and/or reproduces information by radiating light onto a disc (recording medium) through an objective lens and/or by receiving light reflected from the recording medium.

FIG. 1 is an exploded perspective view schematically showing the structure of a conventional optical pickup assembly, FIG. 2 is a side view showing an eddy current occurring in a conventional optical pickup assembly during rotation of a disc, and FIG. 3 is a plane view showing the eddy current shown in FIG. 2.

Referring to FIG. 1, the optical pickup assembly includes: a pickup base 11 installed to slide in a radial direction of a disc; an actuator 12 having a blade 17, which is supported by a plurality of suspensions 15 in a holder 14 fixed in a yoke plate 13, and on which an objective lens 16 is mounted; magnets 18, which are installed on the yoke plate 13 by a predetermined gap and track and/or focus the blade 17; and a cover 19, which is installed to surround the actuator 12, has a hole 19a that is positioned on an upper side of the cover 19, through which light irradiated from the objective lens 16 passes, and which restricts a movement range of the blade 17 in the radial direction of the disc.

The cover 19 restricts the movement range of the blade 17, which is fixedly installed in the yoke plate 13 and moves in the radial direction of the disc by interaction between the cover 19 and the magnets 18. If the optical pickup assembly does not include the cover 19, the objective lens 16 may be damaged while contacting the disc, or a scratch may occur on a surface of the disc.

Referring to FIGS. 2 and 3, information recording and/or reproduction is performed using the optical pickup assembly when the optical pickup assembly makes a reciprocating movement in the radial direction of a disc D while maintaining a predetermined working distance between the disc D and the actuator 12.

Thus, air flow having a uniform speed difference occurs between the disc D and the actuator 12 when the disc D is rotated. In other words, the speed of air adjacent to the disc D is similar to a rotation speed of the disc D, but air speed decreases closer to the actuator 12. The speed difference of the air flow causes an eddy current S on the actuator 12.

As the rotation speed of the disc D increases, a distance between the disc D and the actuator 12 decreases. As a result, the speed of the air flow increases according to Bernoulli's theorem, and the eddy current S increases.

The eddy current flows into the hole 19a positioned on the upper side of the cover 19, and acts on the blade 17 as an asymmetrical force or disturbance. As a result, the blade 17 vibrates upward and downward and disturbs a focusing or tracking operation of the blade 17, so that information recording and/or reproduction is not smoothly performed.

In particular, if a frequency generated by the eddy current S and a natural frequency of the actuator 12 cause resonances, disturbance on the actuator 12 increases.

SUMMARY OF THE INVENTION

An aspect of the present invention provides an optical pickup assembly to reduce a disturbance that occurs during rotation of a disc and affects an actuator.

According to an aspect of the present invention, there is provided an optical pickup assembly. The optical pickup assembly includes a pickup base; an actuator installed in the pickup base, and having a blade on which an objective lens radiating light onto a disc is mounted; a cover, installed surrounding the actuator, and regulating a range of movement of the blade; and an attenuator protruding from an inside of the cover, splitting an eddy current occurring during rotation of the disc into a plurality of small eddy currents, and attenuating a disturbance acting on the blade.

Additional aspects and/or advantages of the invention will be set forth in part in the description which follows, and in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE PREFERRED EMBODIMENTS

Figure 1:
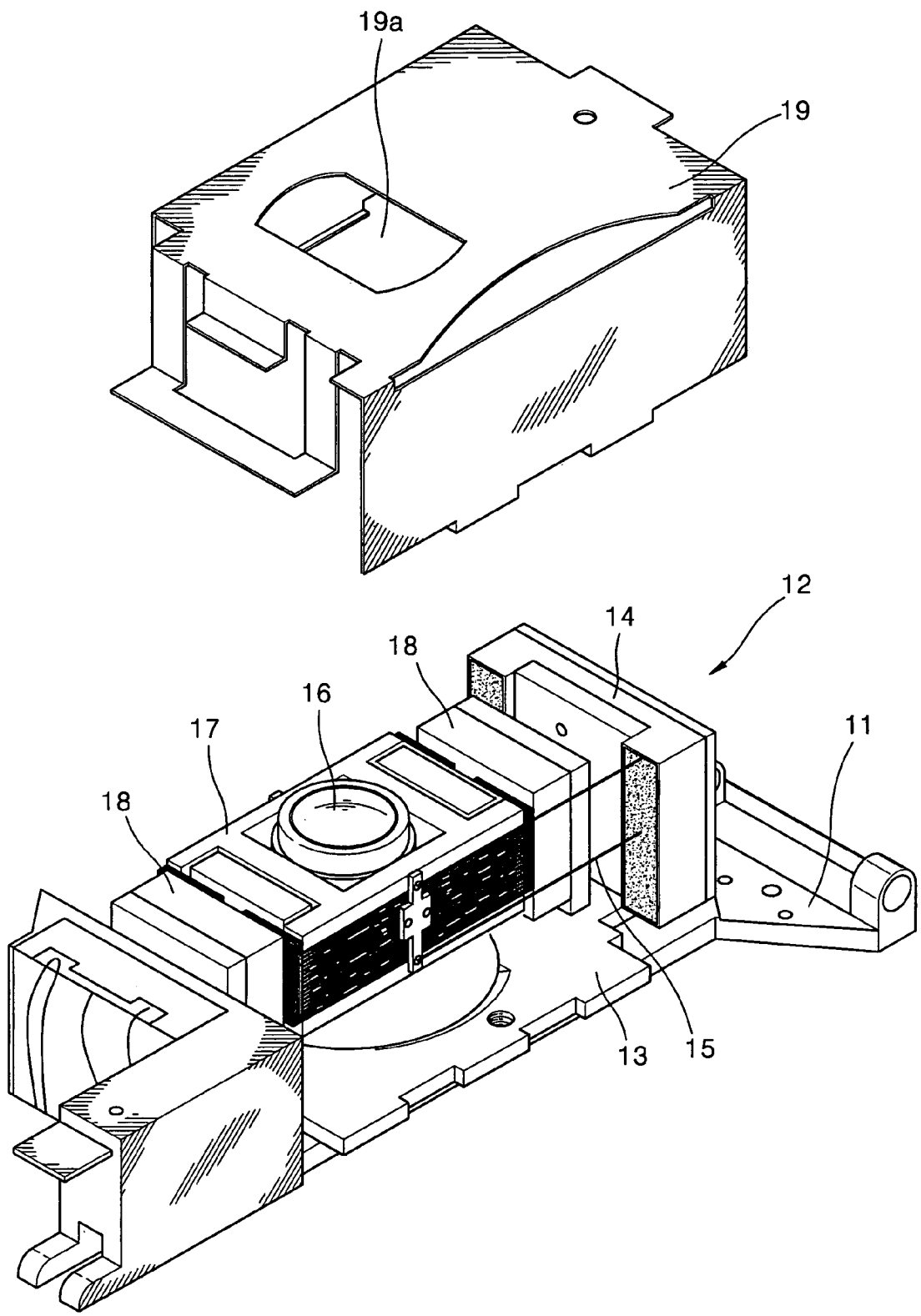
FIG. 1 is an exploded perspective view schematically showing a structure of a conventional optical pickup assembly.
Figure 2:
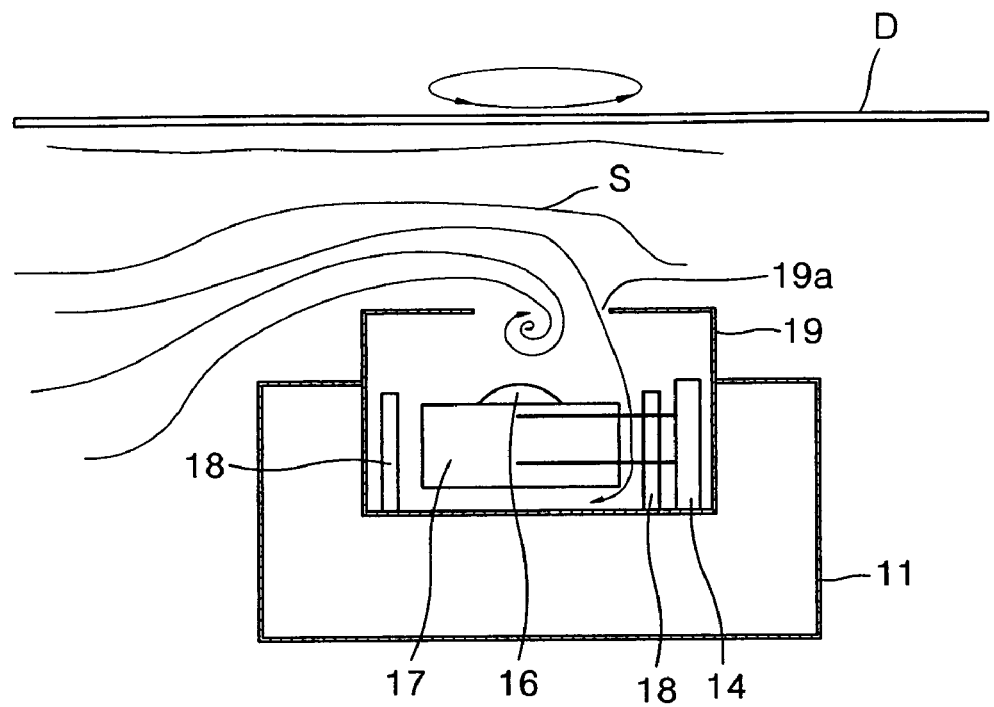
FIG. 2 is a side view showing an eddy current occurring in the optical pickup assembly of FIG. 1 during rotation of a disc.

Reference will now be made in detail to embodiments of the present invention, examples of which are illustrated in the accompanying drawings, wherein like reference numerals refer to the like elements throughout. The embodiments described below explain the present invention by referring to the figures.

Figure 4:
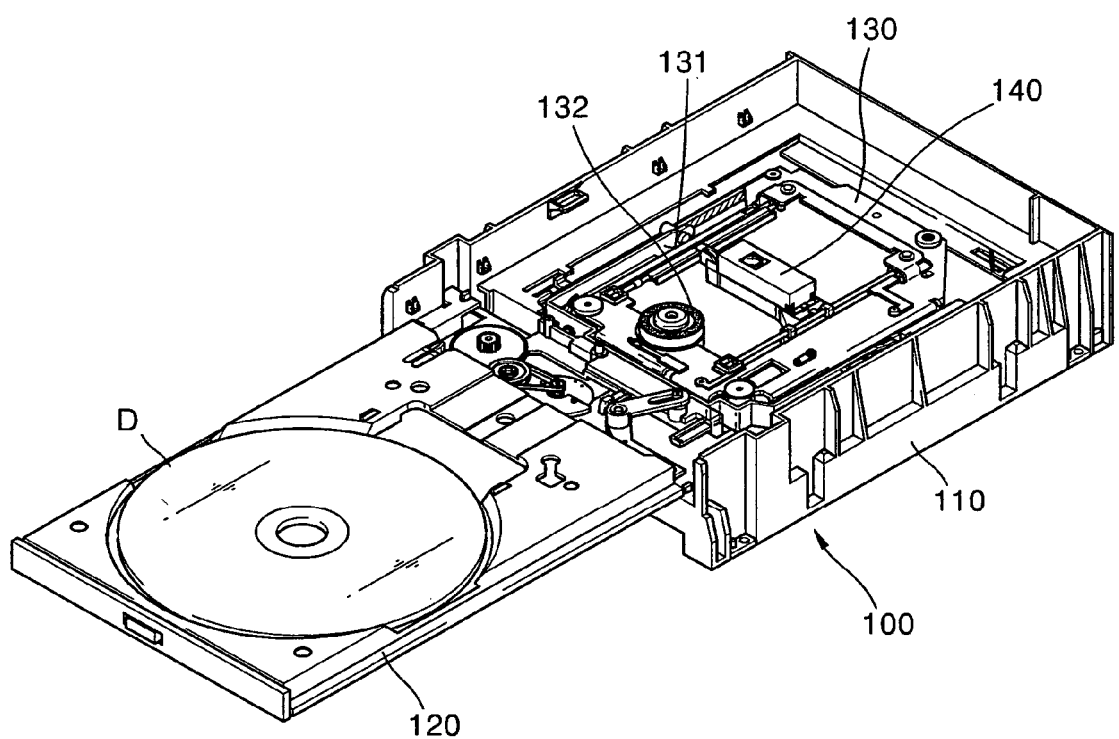
FIG. 4 is a perspective view schematically showing a structure of a disc drive adopting an optical pickup assembly according to an embodiment of the present invention.

Referring to FIG. 4, a disc drive 100 includes: a main frame 110; a tray 120, which is installed to move in and out the main frame 110, and on which a disc D is seated; and a base chassis 130, which is supported by a subframe 131 that can be pivoted in upward and downward directions of the main frame 110.

A turntable 132 and an optical pickup assembly 140 are installed in the base chassis 130. The disc D is transported into the main frame 110 by the tray 120, and is seated on the turntable 132. The turntable 132 is rotated by a spindle motor (not shown). The optical pickup assembly 140 slides in a radial direction of the disc D seated on the turntable 132, records data on the disc D, and/or reproduces recorded data.

Figure 5:
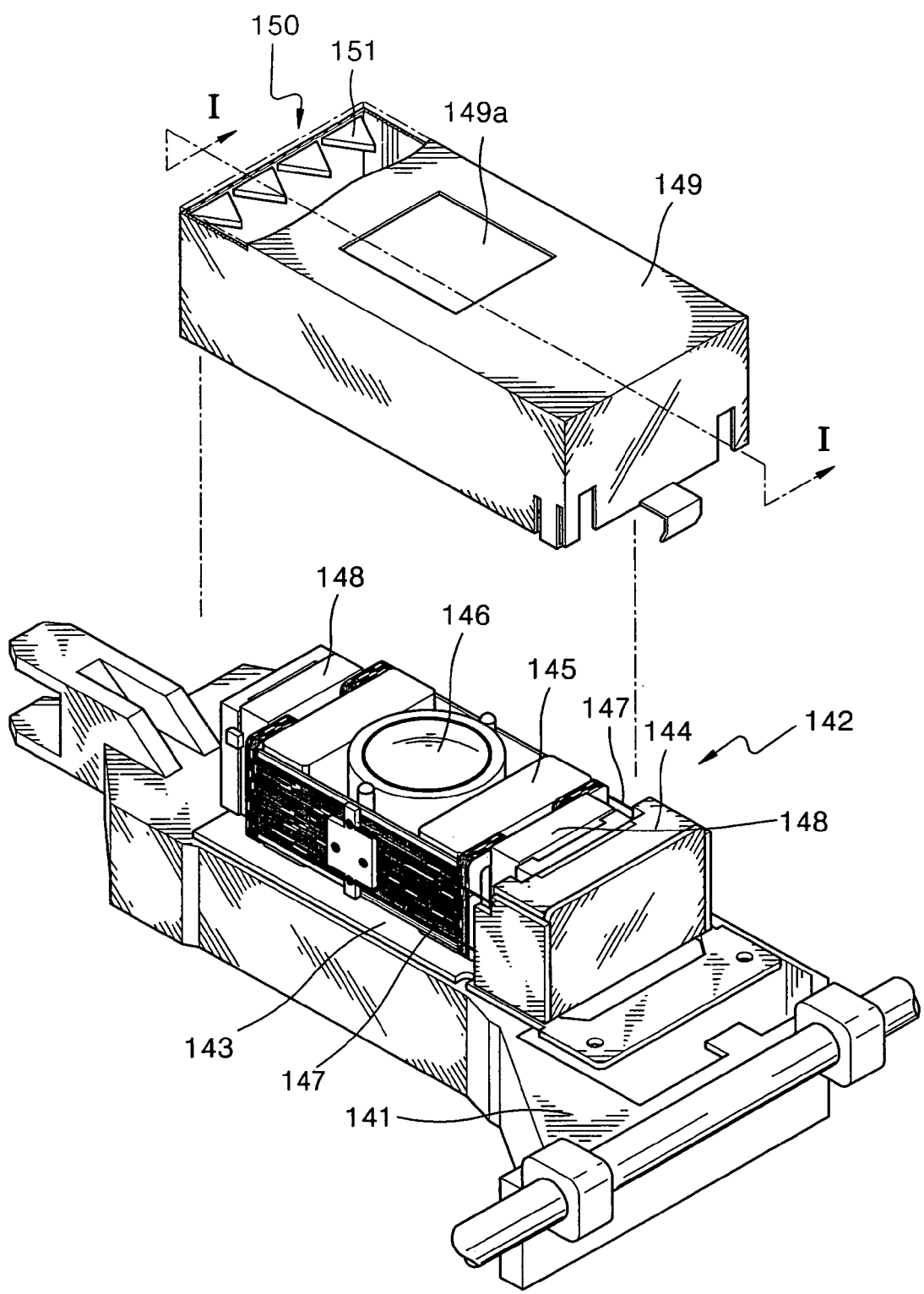
FIG. 5 is an exploded perspective view showing an optical pickup actuator having an attenuator according to a first embodiment of the present invention.

Referring to FIG. 5, the optical pickup assembly 140 includes: a pickup base 141; an actuator 142 having a plurality of magnets 148 fixedly installed on a yoke plate 143 by a predetermined gap, the yoke plate 143 being seated on the pickup base 141; a plurality of suspension wires 147, one end of each of the suspension wires 147 being fixed in a holder 144 fixed on one side of the yoke plate 143, and other ends of each of the suspension wires 147 supporting a blade 145, on which the objective lens 146 is mounted; a cover 149 that is installed to surround the actuator 142, and that regulates the upward and downward movement range of the blade 145 and has a through hole 149a that is formed on an upper side of the cover 149, through which light passes; and an attenuator 150, which is provided inside the cover 149, and splits an eddy current generated during rotation of the disc D into a plurality of small currents.

Figure 6:
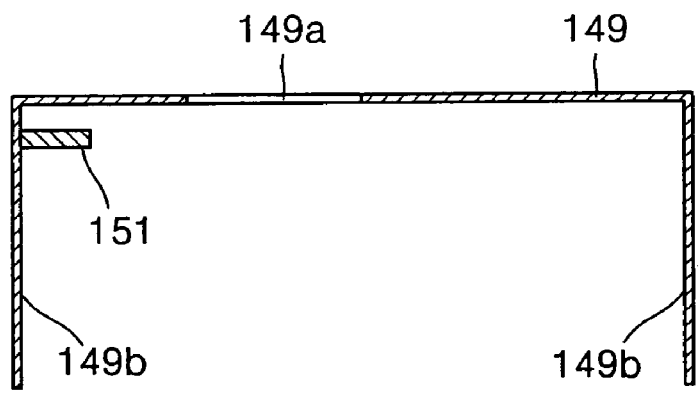
FIG. 6 is a cross-sectional view taken along line I-I of FIG. 5.

Referring to FIG. 6, the attenuator 150, according to a first embodiment of the present invention, has a plurality of projections 151, which are arranged in a single row on one of inner sidewalls 149b, and are spaced a predetermined distance apart from the upper side of the cover 149. According to one embodiment the attenuator 150 is installed on any one of the inner sidewalls 149b. According to one embodiment, the projections 151 are positioned on the inner sidewall 149b parallel to a rotation direction of the disc D.

Figure 7:
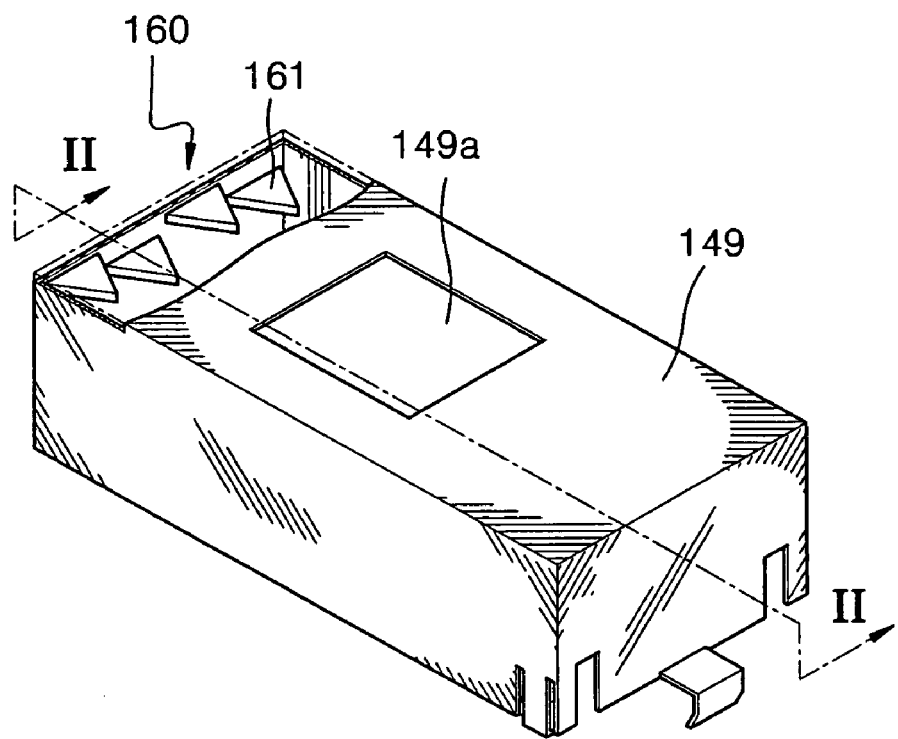
FIG. 7 is an exploded perspective view showing an optical pickup actuator having an attenuator according to a second embodiment of the present invention.
Figure 8:
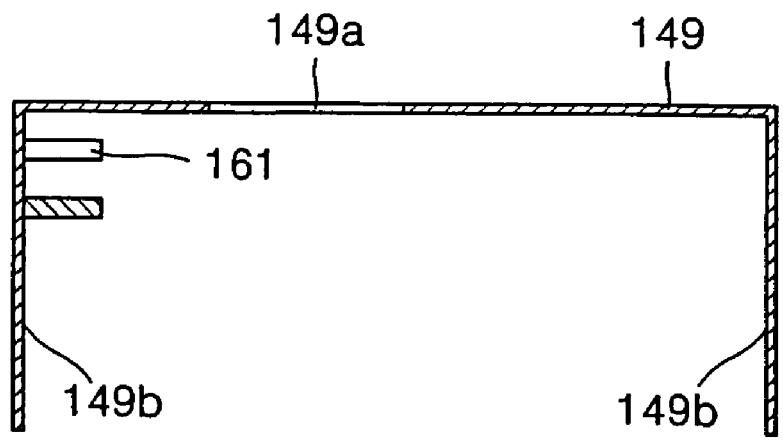
FIG. 8 is a cross-sectional view taken along line II-II of FIG. 7.

Referring to FIGS. 7 and 8, an attenuator 160 according to a second embodiment of the present invention has a plurality of projections 161, which are arranged on one of the inner sidewalls 149b, and are spaced predetermined distances apart from the upper side of the cover 149. The projections 161 are arranged in a plurality of rows in zigzags. In other words, first and second rows of projections 161 are positioned on one of the inner sidewalls 149b of the cover 149, such that the first row of projections 161 is spaced a first predetermined distance from the upper side of the cover 149, and the second row of projections 161 is spaced a second predetermined distance from the upper side of the cover 149. Additionally, according to one embodiment, the projections 161 alternate between the first and second rows of projections. In other words, for example, in a plan view, the projections 161 appear to be a single row, but a first projection is disposed in the first row, a second projection 161 is disposed in the second row, a third projection 161 is disposed in the first row, etc. Put another way, the projections 161 are arrayed in a lateral direction alternating between the first and second rows.

In the above-described embodiments, the respective projections 151 and 161 have a triangular shape. According to alternative embodiments, the respective projections 151 and 161 have a rectangular shape. According to other embodiments, the respective projections 151 and 161 have a trapezoidal shape. According to yet other embodiments, the respective projections 151 and 161 have a conical shape. According to still yet other embodiments, the respective attenuators 150 and 160 have a variety of shapes that protrude from the inner sidewalls 149b of the cover 149, to form a plurality of small eddy currents.

The projections 151 and 161 are positioned on one of the inner sidewalls 149b of the cover 149 parallel to a rotation direction of the disc D, so that the attenuators 150 and 160 reduce the size of an eddy current occurring during rotation of the disc D and attenuate an effect thereof.

Figure 3:
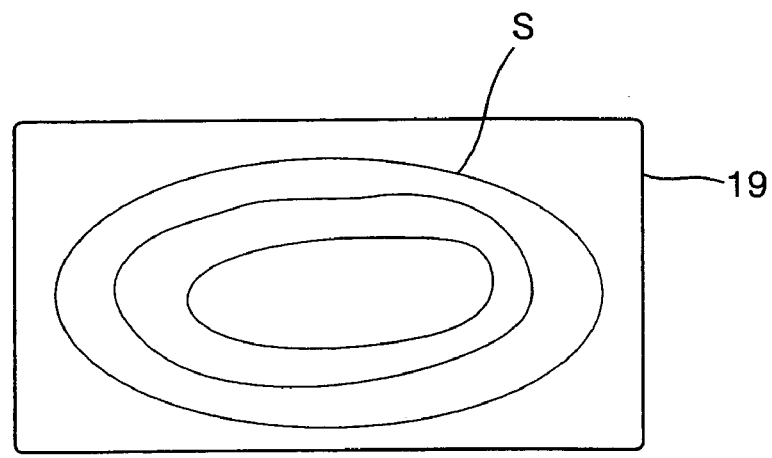
FIG. 3 is a plane view showing the eddy current shown in FIG. 2.
Figure 9:
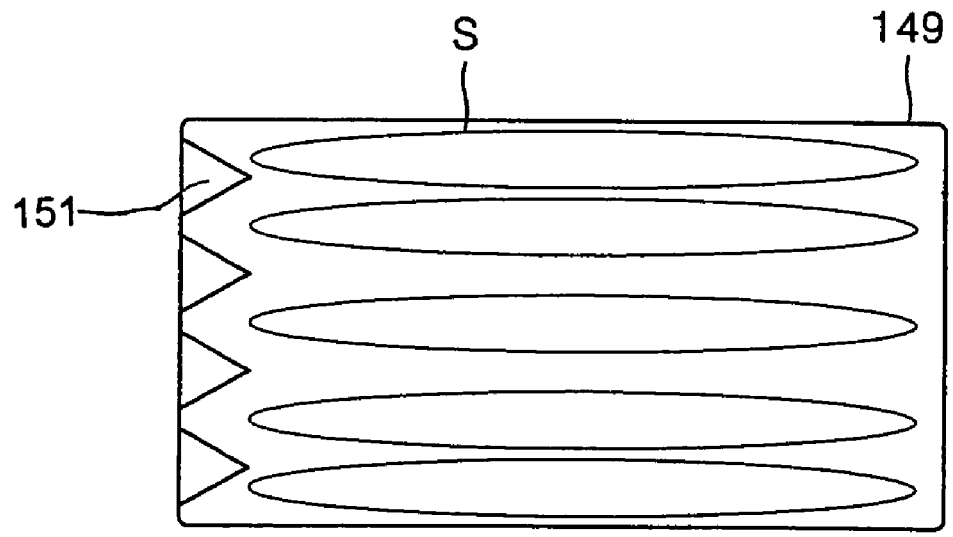
FIG. 9 is a plane view showing an eddy current occurring when the attenuator according to the first embodiment of the present invention is provided inside a cover.

Referring to FIG. 9, when the disc D is rotated within the cover 149 having the attenuator 150, and air flows, the eddy current S is generated. In this case, unlike an eddy current occurring in a conventional cover (FIG. 3), the eddy current S collides with the plurality of projections 151 and is split into a plurality of small currents. In other words, the eddy current S, caused by air flow during rotation of the disc D, collides with the projections 151 in the cover 149, and is split into a plurality of small eddy currents S while being disturbed in a space between the adjacent projections 151.

Figure 10:
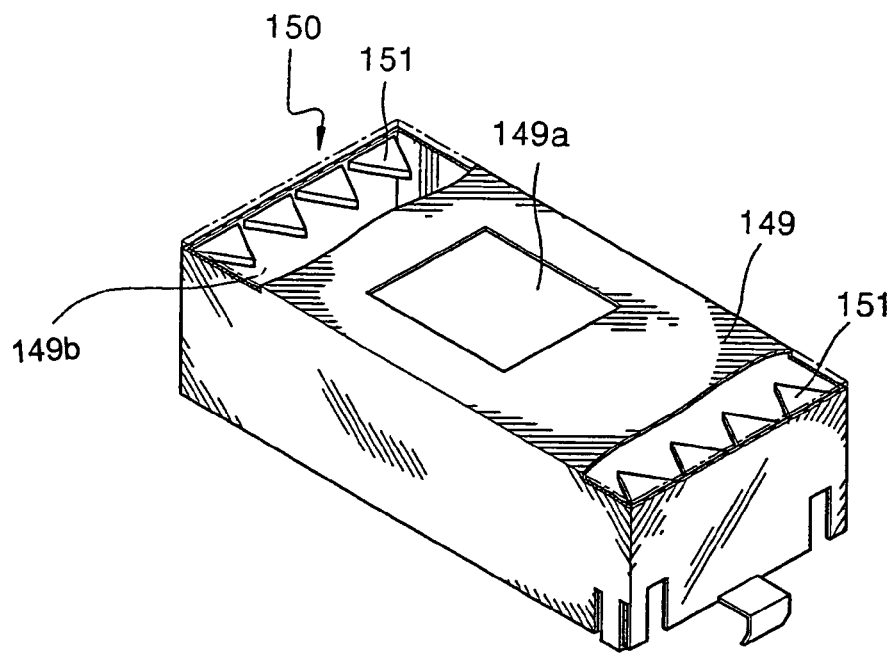
FIG. 10 is a perspective view showing a cover having an attenuator according to a third embodiment of the present invention.
Figure 11:
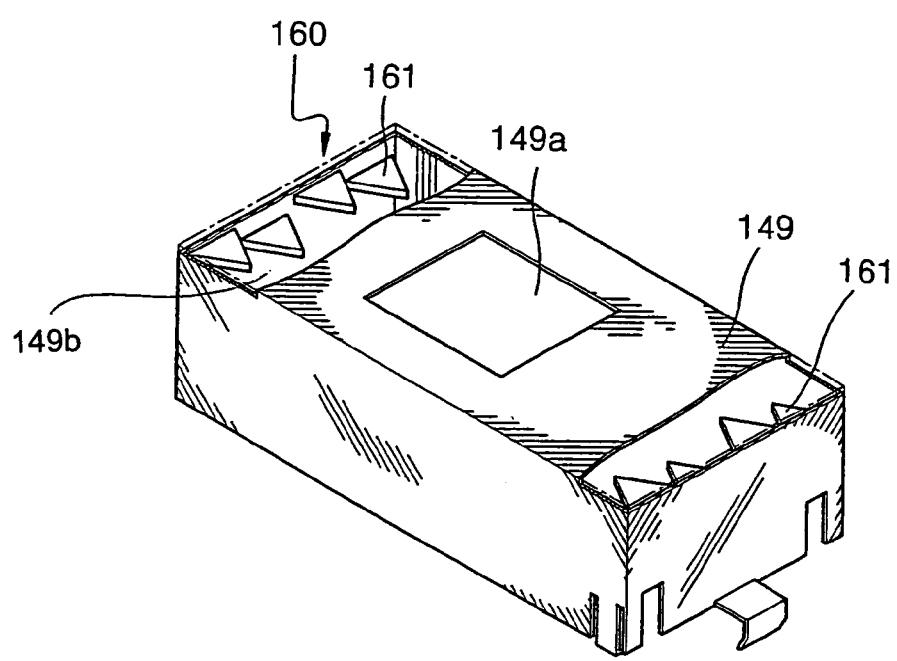
FIG. 11 is a perspective view showing a cover having an attenuator according to a fourth embodiment of the present invention.
Figure 12:
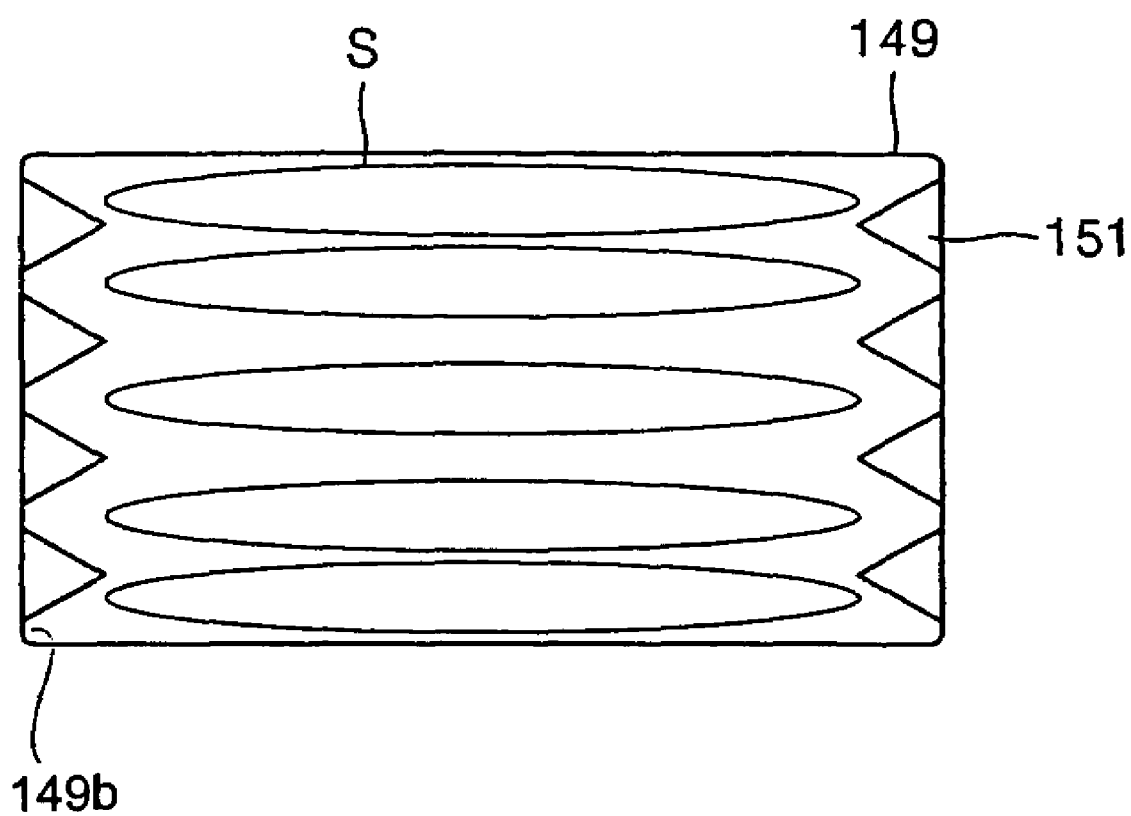
FIG. 12 is a plane view showing an eddy current occurring when an attenuator according to the third embodiment of the present invention is provided inside a cover.

FIG. 10 is a perspective view showing a cover having an attenuator according to a third embodiment of the present invention, FIG. 11 is a perspective view showing a cover having an attenuator according to a fourth embodiment of the present invention, and FIG. 12 is a plane view showing an eddy current occurring when an attenuator according to the third embodiment of the present invention is provided inside a cover.

Referring to FIG. 10, a plurality of projections 151 having the same shape as the shape shown in FIG. 5 are arranged in respective rows disposed on opposed inner sidewalls 149b of the cover 149 to face one another.

Referring to FIG. 11, a plurality of projections 161 having the same shape as the shape shown in FIG. 7 are arranged in respective rows in zig-zags, disposed on opposed inner sidewalls 149b of the cover 149 to face one another. In other words, a plurality of first rows of projections 161 and a plurality of second rows of projections 161 are positioned on the opposed inner sidewalls 149b of the cover 149, such that the first rows of projections 161 are spaced a first predetermined distance from the upper side of the cover 149, the second rows of projections 161 are spaced a second predetermined distance from the upper side of the cover 149, the respective first rows face each other, and the respective second rows face each other. Additionally, according to one embodiment, the projections 161 alternate between the first and second rows of projections. In other words, for example, in a plan view, the projections 161 appear to be single rows on the opposed inner sidewalls 149b, but on both of the opposed inner sidewalls 149b, a first projection is disposed in the first row, a second projection 161 is disposed in the second row, a third projection 161 is disposed in the first row, etc. Put another way, on both opposed inner sidewalls 149b, the projections 161 are arrayed in a lateral direction alternating between the first and second rows.

Referring to FIG. 12, the plurality of projections 151 are arranged to face one another so that the eddy current S occurring during rotation of the disc D collides with the projections 151 positioned on the opposed inner sidewalls 149b, and is split into a plurality of small eddy currents S more easily than in the first and second embodiments.

The plurality of small eddy currents S formed by the projections 151 and 161 deteriorate due to a force being dispersed on the blade (145 of FIG. 5), as opposed to a single large eddy current, so that the small eddy currents have little effect on the adjustment of the blade (145 of FIG. 5) when using the actuator 142.

As is described above, in the optical pickup assembly and the disc drive adopting the same according to embodiments of the present invention, the attenuator 150/160 is provided inside the cover 149, such that an eddy current caused by air flow occurring during rotation of the Disc is split into a plurality of small eddy currents, to attenuate the effect on the adjustment of the blade 145.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical pickup assembly comprising:
    a pickup base;
    an actuator, installed in the pickup base, and having a blade, on which an objective lens to radiate light onto a disc is mounted;
    a cover, installed to surround the actuator, and regulating a range of movement of the blade, the cover having a through hole in a first surface thereof through which an eddy current occurring during rotation of the disc is admitted to the optical pickup assembly, and through which light radiated through the objective lens passes; and
    an attenuator separated a predetermined distance from the first surface and protruding from an inside of the cover, splitting the eddy current into a plurality of small eddy currents, and attenuating a disturbance acting on the blade.

2. The optical pickup assembly of claim 1, wherein the attenuator has a plurality of projections arranged on at least one inner sidewall of the cover.

3. The optical pickup assembly of claim 2, wherein the plurality of projections is arranged on opposed inner sidewalls of the cover, to face one another.

4. The optical pickup assembly of claim 2, wherein the projections are positioned on the inner sidewall of the cover parallel to a rotation direction of the disc.

5. The optical pickup assembly of claim 1, wherein the attenuator has a plurality of projections arranged on at least one inner sidewall of the cover in zigzags.

6. The optical pickup assembly of claim 5, wherein the plurality of projections is arranged on opposed inner sidewalls of the cover, to face one another.

7. The optical pickup assembly of claim 5, wherein the projections are positioned on the inner sidewall of the cover parallel to a rotation direction of the disc.

8. A disc drive comprising:
    a main frame;
    an optical pickup assembly that slides in a radial direction of a disc and records data on the disc and/or reproduces recorded data; and
    a tray on which the disc is mounted, and which moves in and out of the main frame, the optical pickup assembly comprising
    a pickup base,
    an actuator installed in the pickup base, and having a blade, on which an objective lens to radiate light onto a disc is mounted,
    a cover installed to surround the actuator and regulating a range of movement of the blade, the cover having a through hole in a first surface thereof through which an eddy current occurring during rotation of the disc is admitted to the optical pickup assembly, and through which light radiated through the objective lens passes, and
    an attenuator separated a predetermined distance from the first surface and protruding from an inside of the cover, splitting the eddy current into a plurality of small eddy currents, and attenuating a disturbance acting on the blade.

9. The disc drive of claim 8, wherein the attenuator has a plurality of projections arranged on at least one inner sidewall of the cover.

10. The disc drive of claim 9, wherein the plurality of projections is arranged on opposed inner sidewalls, to face one another.

11. The disc drive of claim 9, wherein the projections are positioned on the inner sidewall of the cover parallel to a rotation direction of the disc.

12. The disc drive of claim 8, wherein the attenuator has a plurality of projections arranged on at least one inner sidewall of the cover in zigzags.

13. The disc drive of claim 12, wherein the plurality of projections is arranged on opposed inner sidewalls, to face one another.

14. The disc drive of claim 12, wherein the projections are positioned on the inner sidewall of the cover parallel to a rotation direction of the disc.

15. A cover for an optical pickup assembly to read and/or write information from and/or to an optical disc, the cover comprising:
    a projection projecting from an inner sidewall of the cover, disposed a predetermined distance from a first surface thereof, and disrupting an eddy current created by rotation of the disc, to attenuate an effect of the eddy current on adjustment of the optical pickup assembly, the cover having a through hole in the first surface through which the eddy current attenuated by the projection is admitted to the optical pickup assembly, and through which light irradiated through an objective lens of the optical pickup assembly passes.

16. The cover according to claim 15, wherein the projection is disposed on an inner sidewall of the cover parallel to a rotation direction of the disc.

17. The cover according to claim 15, wherein the projection comprises a plurality of projections arranged in a first row disposed a first predetermined distance from the first surface.

18. The cover according to claim 17, wherein the first row is disposed only on one inner sidewall of the cover.

19. The cover according to claim 17, wherein the first row is disposed on opposed inner sidewalls of the cover.

20. The cover according to claim 17, wherein the projection further comprises a plurality of projections arranged in a second row disposed a second predetermined distance from the first surface.

21. The cover according to claim 20, wherein the first and second rows are disposed only on one inner sidewall of the cover.

22. The cover according to claim 21, wherein the projections are arrayed in a lateral direction alternating between the first and second rows.

23. The cover according to claim 21, wherein in order along a lateral direction, a first projection is disposed in one of the first and second rows, a second projection is disposed in the remaining one of the first and second rows, and a third projection is disposed in the one of the first and second rows.

24. The cover according to claim 20, wherein the first and second rows are disposed on opposed inner sidewalls of the cover.

25. The cover according to claim 24, wherein the projections are arrayed in a lateral direction alternating between the first and second rows.

26. The cover according to claim 24, wherein in order along a lateral direction, respective first projections are disposed in one of the respective first and second rows, respective second projections are disposed in the remaining ones of the respective first and second rows, and respective third projections are disposed in the one of the respective first and second rows.

27. An optical pickup assembly to read and/or write information from and/or to an optical disc, the optical pickup assembly comprising:
   a pickup base movable in a radial direction of an optical disc;
   an actuator connected with the pickup base and having a blade on which an objective lens is mounted; and
   a cover
      surrounding the actuator,
      regulating a movement range of the blade,
      having a through hole on a first surface thereof through which an eddy current created by rotation of the disc is admitted, and through which light irradiated through the objective lens passes, and
      having an attenuator disposed on an inner sidewall of the cover a first distance from the first surface, that disrupts the eddy current, to attenuate an effect of the eddy current on movement of the blade.

28. The optical pickup assembly according to claim 27, wherein the attenuator comprises a plurality of projections arranged in a first row, along the radial direction of the optical disc.

29. The optical pickup assembly according to claim 28, wherein the first plurality of projections are disposed on opposed inner sidewalls of the cover.

30. The optical pickup assembly according to claim 29, wherein the attenuator further comprises a plurality of projections arranged a second distance from the first surface in a second row, along the radial direction of the optical disc.

31. The optical pickup assembly according to claim 30, wherein the projections are arrayed in the radial direction of the optical disc, alternating between the first and second rows.

32. The optical pickup assembly according to claim 28, wherein the attenuator further comprises a plurality of projections arranged a second distance from the first surface in a second row, along the radial direction of the optical disc.

33. The optical pickup assembly according to claim 32, wherein the projections are arrayed in the radial direction of the optical disc, alternating between the first and second rows.

34. An optical pickup assembly comprising:
   a blade;
   an objective lens mounted on the blade; and
   a cover having
      a through hole in a first surface thereof, through which an eddy current caused by airflow induced during rotation of a disc is admitted to the optical pickup assembly, and through which light irradiated through the objective lens passes, and
   an attenuator disposed inside the cover a predetermined distance from the first surface, such that the eddy current is split into a plurality of eddy currents to attenuate an effect of the airflow on adjustment of the blade.

* * * * *

UNITED STATES PATENT AND TRADEMARK OFFICE
CERTIFICATE OF CORRECTION

PATENT NO. : 7,296,281 B2  Page 1 of 1
APPLICATION NO. : 10/937256
DATED : November 13, 2007
INVENTOR(S) : Won-ik Cho et al.

It is certified that error appears in the above-identified patent and that said Letters Patent is hereby corrected as shown below:

Column 6, Line 3, after "comprising" insert --:--.

Signed and Sealed this

Twenty-ninth Day of April, 2008

JON W. DUDAS
*Director of the United States Patent and Trademark Office*